United States Patent [19]

Michaelson

[11] Patent Number: 5,893,541
[45] Date of Patent: Apr. 13, 1999

[54] MICROPHONE STAND PROVIDING QUICK ASSEMBLY AND DISASSEMBLY

[76] Inventor: Donald Michaelson, 9 Fordham Dr., Milford, Mass. 01757

[21] Appl. No.: 08/702,233

[22] Filed: Aug. 27, 1996

[51] Int. Cl.$^6$ ..................................................... F16M 13/00
[52] U.S. Cl. ........................... 248/158; 248/161; 403/376; 403/DIG. 6
[58] Field of Search ..................... 248/158, 159, 248/406.1, 407, 412, 413, 418, 519, 521, 523, 524, 527, 125.8, 161, 346.03, 364.04; 403/DIG. 6, 373, 375, 376, 377

[56] References Cited

U.S. PATENT DOCUMENTS

| | | | |
|---|---|---|---|
| 2,459,785 | 1/1949 | Allierton | 248/412 |
| 3,573,401 | 4/1971 | Lininger | 179/147 |
| 4,394,097 | 7/1983 | Horlacher | 403/376 |
| 4,760,984 | 8/1988 | Hennessey | 248/121 |
| 4,943,182 | 7/1990 | Hoblingre | 403/349 |
| 5,046,693 | 9/1991 | Browne | 248/159 |
| 5,048,789 | 9/1991 | Eason et al. | 248/544 |
| 5,497,965 | 3/1996 | Mathieu, Jr. | 248/159 |

*Primary Examiner*—Ramon O. Ramirez
*Assistant Examiner*—Anita M. King
*Attorney, Agent, or Firm*—Edwin H. Paul, Esq.

[57] ABSTRACT

A spring loaded or mechanically activated detent for a microphone stand that allows for quick disassembly and re-assembly. The microphone main shaft (102) is terminated at the lower end with a circumferential raceway or slot (44). The base has a coaxial matching cavity that accepts the lower end of the microphone shaft. At a depth to match the raceway, a spring loaded ram, positioned radially, extends into and mates with the raceway to secure the shaft to the base. In another preferred embodiment a spring clip or a stiff clip can be mechanically inserted through a radially extended opening in the base to engage the slot in the lower end of the shaft. There may be other such rams distributed around the circumference of the shaft. In another preferred embodiment the raceway may extend only partially around the circumference of the shaft. The raceway will be of a uniform depth for some arc length ending with a lip and a ramp up to the surface. This arrangement allows the shaft to be twisted overcoming the lip against the spring force and then twisted farther to free the shaft from the base. The invention is arranged to refit existing microphone stands. A plug (12) is threaded into the lower end of the shaft, or microphone pole, and may be secured with a set screw. This plug has a shaft extending from the bottom that has at least one circumferential raceway (20). A tapped receptacle (22) is screwed into the base. The receptacle has a coaxial cavity that accepts and mates with the second shaft. The receptacle has a spring loaded ram (28) or a spring of stiff clip that are radially positioned and retained in the receptacle. The ram or the clips extend into the raceway to secure the main microphone shaft to the base.

9 Claims, 3 Drawing Sheets

MICROPHONE STAND PROVIDING QUICK ASSEMBLY AND DISASSEMBLY

FIELD OF THE INVENTION

The field of the present invention relates to microphone and music stands and more particularly to stands that are quickly disassembled and re-assembled.

BACKGROUND OF THE INVENTION

Microphone and music stands are constructed for disassembly such that the stands may be transported easily. When assembled, these stands are awkward and not easily stored so that virtually all such stands may be disassembled. The base is very heavy compared to the shaft so that when upright the microphone is very stable. This disproportioned weight becomes a further impediment if the microphone stand is transported without disassembly.

Entertainers tour this country playing on successive nights in locations that may be in the next city or across the country. In such instances, the stands are disassembled each night and re-assembled each day. Quick and easy disassembly and re-assembly provides an important advantage.

Existing microphone stands are disassembled by unscrewing the stand shaft from the base. The issue is that there are many threads with a very fine pitch. The result is a time consuming and frustrating disassembly and assembly. The fine pitch is useful to make the pole to base combination very secure with no wobble or play between the pole and the base. This threaded connection is very rugged as well because the base is heavy (over 5 pounds) but the pole and the base are often picked up during a performance. If the pole and base became detached or loose fitting the performance would suffer—hence the very stable, rugged construction.

Music stands are often made of foldable metal straps that store and transport well. However, some such stands are built similarly to microphone stands and these stands will benefit from the present invention.

U.S. Pat. No. 5,046,693 to Browne, issued on Sep. 10, 1991, entitled MICROPHONE STAND COUPLER, discloses a bayonet-type coupler. This invention provides a quick disconnect microphone pole from a base. The microphone pole has a hole to accommodate a lever actuated cam mechanism. The cam lever interacts with the base to secure the pole to the base but allows actuation of the lever to quickly disconnect the pole from the base.

U.S. Pat. No. 4,943,182 to Hoblingre, issued on Jul. 24, 1990, entitled RAPID FASTENER OF THE BAYONET-TYPE, discloses another quick disconnect mechanism. This invention is an axial spring loaded bayonet. A pole is held to a base by the spring load. By twisting the pole relative to the base against the spring load the pole is positioned for removal.

Another example of prior art is found in a product named QUICK KLIP made by TMP. This is a device embodying a quick disconnect of a microphone from the microphone shaft or pole. The device has a spring loaded cam built into a device that may be screwed or threaded to an existing microphone. A mating tubular device is attached to the pole. The plug has a groove and an anti-rotating design. The tubular device has a spring loaded cam that, when the plug is inserted into the tubular device, engages the groove and prevents disconnecting the two pieces from each other. A button connected to the cam may be pressed, and working against the spring retracts the cam to allow disengagement of the microphone from the pole. This device is light weight and relatively fragile. It is built for the light weight of the microphone itself or another light weight pole extension.

It is an object of the present invention to provide a smooth mating of a microphone stand, the shaft and the base, where the pieces are guided for quick assembly and disassembly of a microphone stand.

It is another object to provide means for refitting existing microphone stands to incorporate quick disassembly and re-assembly as disclosed in the present invention, yet to make the apparatus rugged to withstand handling during performances.

It is another object to provide a quick disassembly microphone stand that provides a twist off mechanism to further facilitate disassembly.

It is another object to provide a keying arrangement to provide a known orientation of the pole to the base of the microphone stand.

SUMMARY OF THE INVENTION

The above objects are met in a microphone stand arranged for disassembling including a first shaft with one end arranged and constructed to support a microphone, and a second end with raceway means arranged and constructed circumferentially around the outer surface of the second end. The base has a coaxial cavity or bore arranged to accept the second end. There is an aperture extending from a side of the cavity into the base radially with respect to the shaft's second end with the aperture positioned at a depth in said base to be adjacent to the raceway when the second end is inserted into the cavity. There is a ram means slideably positioned in the aperture with the ram means arranged with a head that extends through said side of the cavity and mates with the raceway. The ram means tail is attached mechanically directly to the base means whereby the ram may be driven directly into the raceway, or, in a preferred embodiment, with resilient or spring means that will drive the ram through the aperture into the raceway.

The objects are met in apparatus arranged to refit into existing microphone stands to allow quick disassembly and re-assembly of those existing stands. This refitting includes a plug with a shaft having a circumferential raceways on the shaft outer surface. The plug is arranged to connect to the tapped lower end of existing microphone shafts. A receptacle is arranged to matingly thread into the base threaded opening of existing bases. The receptacle has a cavity or bore that accepts the plug shaft. The receptacle is arranged with an aperture positioned at a depth in the receptacle to be adjacent to the raceway when the plug shaft is inserted into said cavity. Ram means are slideably positioned in the aperture, the ram means arranged with a head that extends through the side of the bore c to mate with the raceway. Ram means are arranged with a tail, and with mechanical means or a resilient means attaching the tail to the base means such that the ram means is driven through said side of said cavity into said raceway.

Other preferred embodiments include second apertures and rams dispersed around the circumference of the raceway. In yet other embodiments the raceways are not of uniform depth, but are arranged with a lip and then a ramp to facilitate disconnecting the rams from the raceways by twisting the shaft against the spring load and forcing the rams to overcome the lips, and then by continuing the twisting forcing rams to travel up the ramp to a location on the shaft with little or no raceway such that the shaft is only lightly secured to the base and therefore easily disconnected from the base.

Other preferred embodiments replace the raceway with a slotted channel having steep sides. A spring clip or a stiff clip is inserted through a flat channel in the base or the receptacle to engage the slot to secure the shaft to the base or the plug to the receptacle. The end of the clips extends such that the clip may be extracted from the flat channel.

A flat surface, a grooved keyway or other such known keyways along the plug shaft with a mating structure in the receptacle bore will orient the microphone stand in a known orientation.

Other objects, features and advantages will be apparent from the following detailed description of preferred embodiments taken in conjunction with the accompanying drawings in which:

BRIEF DESCRIPTION OF PREFERRED EMBODIMENTS

Figure 1A:
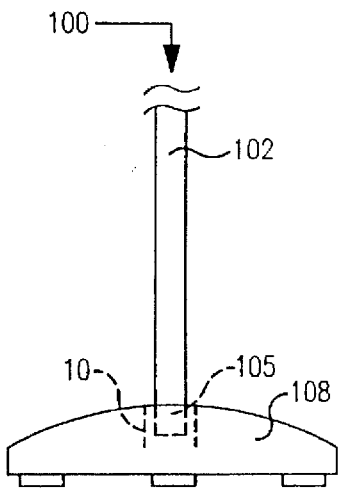
FIG. 1A is a view of an existing microphone stand and base.
Figure 1B:
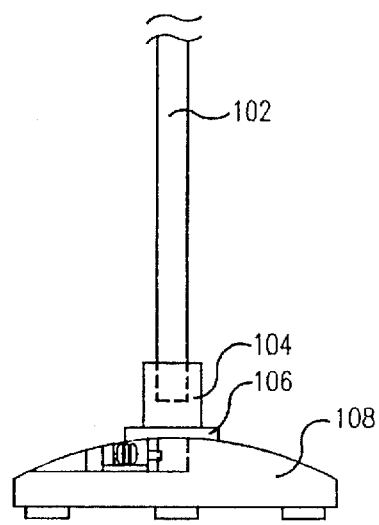
FIG. 1B is a view of the microphone and base of FIG. 1A refit with the present invention.

FIG. 1A shows a typical existing microphone stand 100. The main pole 102 has a tapped end 105 that is screwed into the base 108 with the matching tapped threads. FIG. 1B shows the existing microphone shaft or pole 102 and base 108, refitted with a plug and a receptacle, respectively. The plug and receptacle made in accordance with the present invention. The bottom of the pole is joined by a threaded connection to an adapter plug 104 that is made to fit into an adapter receptacle 106. The receptacle is connected via a threaded connection to an existing base 108.

Figure 2A:
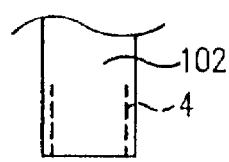
FIG. 2A is a sectioned view of a the lower end of a microphone shaft.
Figure 2B:
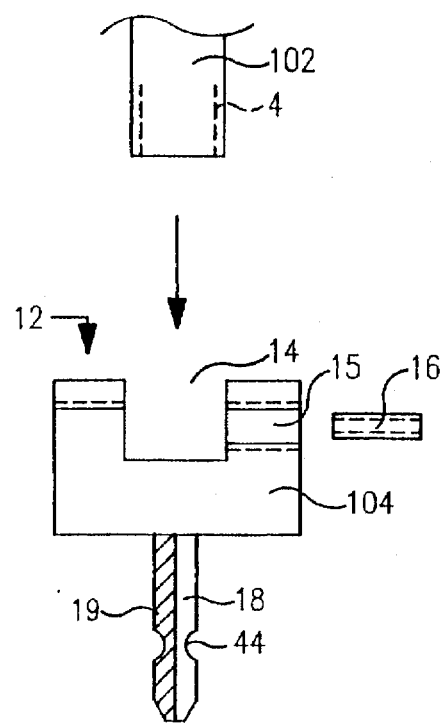
FIG. 2B is a part of a plug embodying the present invention.
Figure 2C:
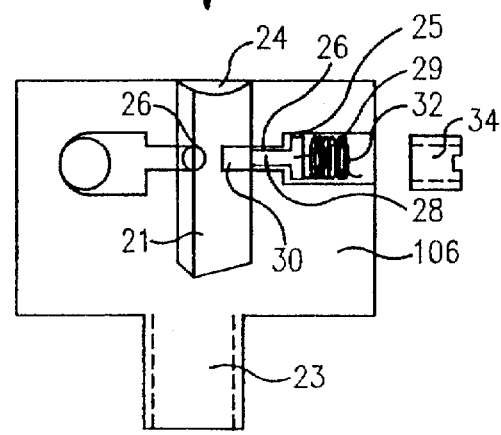
FIG. 2C is a receptacle embodying the present invention.
Figure 2D:
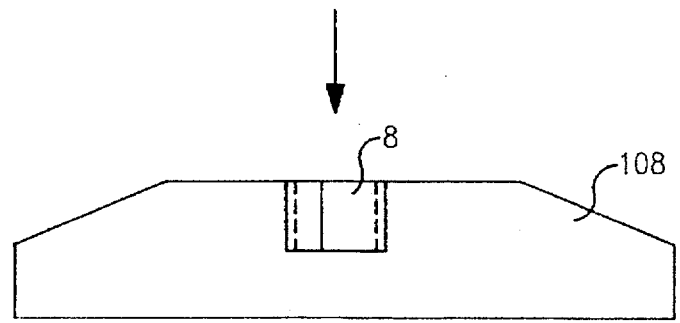
FIG. 2D is a sectioned view of a microphone base.

FIG. 2A represents the bottom of the pole 102, and FIG. 2D represents the base 108. The threads 4 on the pole mate with the threads 10 on the base, as shown in FIG. 1A. But, here the pole directly screws to the plug 104 via the threads 4, and the receptacle 106 is attached via the threads to the base. The pole FIG. 2A fits into the plug 12 of FIG. 2B, which in turn fits into the receptacle of FIG. 2C which in turn fits into the base of FIG. 2D. The plug 12 has a threaded opening 14 that accepts the threaded end of the existing shaft 102. When the end 102 is firmly threaded onto the plug the opening 15 radially extends through the wall of the plug. A set screw 16 is threaded into the opening 15 and secures the end 102 in the plug 12. A cement, e.g. LOCTITE™, may be included on the end of the set screw 16 that abuts the pole 102 and on the threads to further secure the pole to the plug. The plug has a coaxial shaft extension 18 with a raceway 44. A flat surface 19 provides a means for keying that extends longitudinally along the shaft 18. The flat 19 ensures that the plug will always be inserted in the receptacle 106 with the same rotational orientation.

A receptacle 106 shown in FIG. 2C, is constructed with a coaxial tapped bottom extension 23 that mates with the base opening 8. This receptacle may be secured with cement on the threads. The receptacle has a top cavity 24 that is coaxial with the tapped extension 23, and the cavity has a matching flat 21 means for keying to match the means for keying 19 of shaft 18. The cavity 24 is constructed to accept the shaft extension 18. Two radial apertures 26 are constructed in the receptacle at a depth to match the raceway 44 when the shaft 18 is inserted into the cavity 24. A ram 28 is slideably retained in the aperture with the head 30 of the ram intruding into the cavity 24. The tail 29 of the ram is spring loaded 32. The ram is prevented from extending too far into the cavity by shoulders 25. The ram is retained in the cavity by a set screw 34 with the spring 32 arranged between the ram tail and the set screw. The set screw 34 maybe constructed to compress the spring to increase the force of the ram head into the cavity. In the cutaway view of FIG. 2C a second aperture opening 26 is shown where a second retained spring loaded ram head intrudes into the cavity. The two ram heads will mate with and secure the shaft raceway 44 to the receptacle. In a preferred embodiment, the second ram is positioned 65 about 135 degrees away from the first ram, as shown in FIG. 4.

Figure 3A:
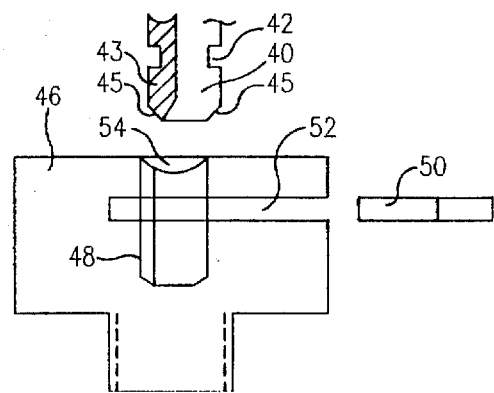
FIG. 3A is a sectioned view of the plug utilizing a spring or stiff clip.
Figure 3B:
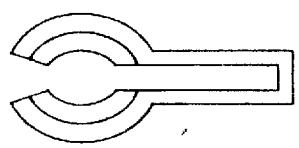
FIG. 3B is a top view of a clip.

FIG. 3A shows another preferred embodiment of the receptacle and plug. The end of the plug second shaft 40 has a slot or groove extending around 360° of the second shaft. This slot has square sides compared to the rounded sides of the raceway 44 of FIG. 2B. The shaft has the keying flat 43 and chamfered ends 45. The receptacle 46 has a cavity 54 that accepts the shaft 40, and the cavity has a keying flat surface 48 that matches the keying flat 43 of the shaft. A spring clip 50 is constructed to fit snugly into the flat opening 52. The flat opening 52 extends radially into the cavity 54.

Figure 4:
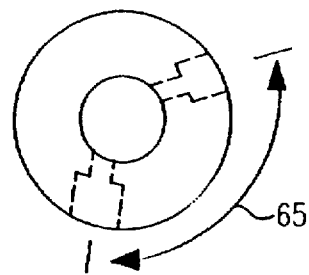
FIG. 4 is a top view of the receptacle.

FIG. 4 shows the distribution 65 of the rams from each other around the circumference of the cavity—the preferable distance is 135°.

Figure 5:
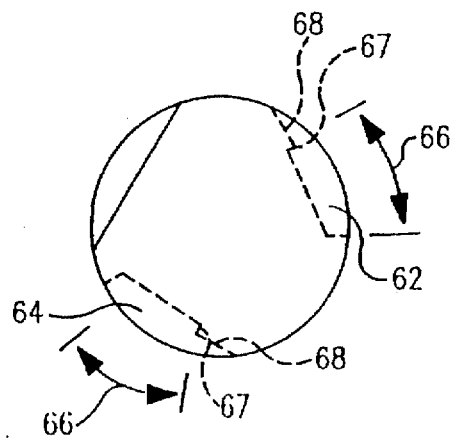
FIG. 5 is a sectioned view through the ramped raceways of the second shaft of the plug.
Figure 6:
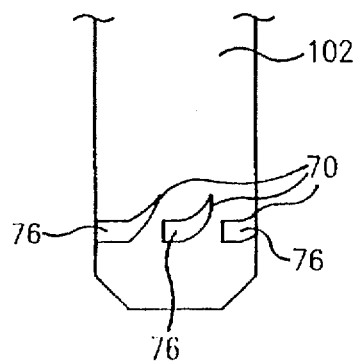
FIG. 6 is a side view of the raceways on a shaft in a preferred embodiment.

FIG. 5 is a cross section view of raceways in accordance with the present invention. FIG. 5 shows two separated raceways 62 and 64 each with a uniform depth covering an arc of about 45 degrees of circumference. Each raceway has a lip 67 and a ramp section 68 that facilitates removal of the rams from the raceway to allow ease of removal of the shaft 42 from the cavity 48. The ram is retained by the lip 67 in the arc 66, the lip is more easily overcome than the raceway sides. Since the base is heavy and the microphone stand may be lifted during a performance the rams may be pushed by heavy spring action. To remove the pole by simply pulling on the pole may be laborious depending upon the spring force. The lips 67 are overcome by twisting and may be designed for removal with less force than without the ramps. In other preferred embodiments, FIG. 6, three or raceways 70 are arranged with ramps 70 arranged in a serpentine manner up the sides of the pole to prevent the raceways from overlapping and interfering with each other as shown in FIG. 6.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A microphone stand for providing quick assembly and disassembly, comprising:

a first shaft with a first end for supporting a microphone and a second end, a raceway constructed circumferentially around said second end of said first shaft, a base for supporting the entire microphone stand, said base with a cavity with sides extending into said base, said cavity coaxial with and arranged to accept said second end, an aperture extending from said side of said cavity into said base, said aperture positioned at a depth in said base to be adjacent to said raceway when said second end is inserted into said cavity, a ram slideably positioned in said aperture, said ram having a head that extends through said side of said cavity and mates with said raceway, said ram having a tail, means for resiliently driving said ram through said aperture into said raceway.

2. The stand as defined in claim 1 further comprising a second aperture said second aperture positioned around said cavity from said first aperture, a second ram and second means for resiliently driving said second ram through said second aperture into said raceway.

3. The stand as defined in claim 2 wherein said second aperture and ram are placed about 135° around the cavity from the first aperture.

4. The stand as defined in claim 1 further comprising a plurality of apertures each aperture with a ram and means for resiliently driving said ram through said aperture into said raceway, said plurality of apertures distributed around said cavity.

5. The stand as defined in claim 1 wherein said raceway is constructed with a first part having a uniform depth that extends less than 360 degrees around the circumference of the first shaft, and said first shaft having an outer surface, and wherein the raceway is arranged with a second part formed as a first lip disposed across said raceway and then a first ascending ramp to the outer surface of the first shaft such that there is a first rotational location where the ram is substantially pushed back into the aperture, said first rotational location arranged to facilitate removal of the shaft from said base.

6. The stand as defined in claim 5 further comprising at least a second raceway and a second ram, wherein said second raceway is constructed with a first part having a uniform depth that extends less than 360 degrees around the circumference of the first shaft, and wherein the second raceway is arranged with a second part formed as a second lip disposed across said second raceway and then a second ascending ramp to the outer surface of the first shaft such that there is a second rotational location where the second ram is substantially pushed back into the aperture, said rotational location arranged to facilitate removal of the shaft from said base.

7. An apparatus, for converting a microphone stand having a tapped first shaft and a base with a mating tapped first hole into a quick disconnect microphone stand, comprising:

a plug including a body with a tapped or threaded second hole, the tapped second hole constructed to accept the tapped first shaft, said plug having a second shaft arranged opposite the tapped second hole, said second shaft extending from the plug coaxially with said tapped second hole, a first keyway extending longitudinally along said second shaft, a raceway constructed circumferentially around an outer surface of the second shaft, a receptacle with a bore and with a third shaft adapted to matingly fit the tapped first hole in the base, the bore with a second keyway that mates with the first keyway said bore extending coaxially with the tapped second shaft an aperture extending from the side of the bore the aperture positioned at a depth in the bore to be adjacent to the raceway when the second shaft is inserted into the bore, a ram slideably positioned in said aperture, said ram having a head that extends through said side of said bore and mates with said raceway, said ram having a tail, and means for resiliently driving said ram through said aperture and into said raceway.

8. The apparatus as defined in claim 7 further comprising a second aperture, a second ram and second means for resiliently driving said second ram through XXXXsaid second aperture into said raceway.

9. A microphone stand for providing quick assembly and disassembly comprising:

a first shaft with one end constructed for accepting a microphone, and a second end, a groove or slot constructed circumferentially around the second end of said shaft, a base for supporting the entire microphone stand, said base with a cavity with sides extending into said base, said cavity coaxial with and arranged to accept said second end, an aperture extending from said side of said cavity said aperture positioned at a depth in said base to be adjacent to said groove or slot when said second end is inserted into said cavity, a removable spring clip slideably positioned in said aperture, and means for sliding said spring clip such that the spring clip extends through said side of said cavity and mates with said groove.

* * * * *